(12) United States Patent
McBee et al.

(10) Patent No.: US 7,478,838 B2
(45) Date of Patent: Jan. 20, 2009

(54) QUICK-CONNECT FITTING

(75) Inventors: Jeffrey W. McBee, Cincinnati, OH (US); Dennis Stutz, Lawrenceburg, IN (US)

(73) Assignee: Cincinnati Test Systems, Inc., Cleves, OH (US)

( * ) Notice: Subject to any disclaimer, the term of this patent is extended or adjusted under 35 U.S.C. 154(b) by 456 days.

(21) Appl. No.: 11/275,779

(22) Filed: Jan. 27, 2006

(65) Prior Publication Data

US 2007/0176415 A1 Aug. 2, 2007

(51) Int. Cl.
*F16L 17/00* (2006.01)

(52) U.S. Cl. ............................ 285/101; 285/96; 285/106

(58) Field of Classification Search .................... 285/96, 285/100–102, 106, 113, 201–210, 213, 219–221; 141/383–386
See application file for complete search history.

(56) References Cited

U.S. PATENT DOCUMENTS

| | | | | |
|---|---|---|---|---|
| 3,228,678 | A | 1/1966 | Koger | 269/48.1 |
| 4,154,465 | A | 5/1979 | Van Meter | 285/312 |
| 4,207,934 | A * | 6/1980 | Scremin et al. | 141/383 |
| 4,225,159 | A | 9/1980 | Van Meter | 285/104 |
| 4,345,783 | A | 8/1982 | Bergstrand | 285/12 |
| 4,688,830 | A | 8/1987 | Meisinger et al. | 285/100 |
| 4,759,572 | A | 7/1988 | Richardson | 285/101 |
| 4,793,636 | A | 12/1988 | Keck | 285/12 |
| 4,869,300 | A | 9/1989 | Gudenau et al. | 141/59 |
| 4,884,830 | A | 12/1989 | Meisinger | 285/94 |
| 4,970,904 | A | 11/1990 | Knotts | 73/863.86 |
| 4,984,826 | A | 1/1991 | Yokomatsu et al. | 285/101 |
| 5,024,079 | A | 6/1991 | Dufort | 73/49.8 |
| 5,150,924 | A | 9/1992 | Yokomatsu et al. | 285/101 |
| 5,170,659 | A | 12/1992 | Kemp | |
| RE34,715 | E | 9/1994 | Gudenau et al. | 141/59 |
| 5,439,258 | A | 8/1995 | Yates | 285/313 |
| 5,507,537 | A | 4/1996 | Meisinger et al. | 285/312 |
| 5,762,095 | A | 6/1998 | Gapinski et al. | 137/223 |
| 5,789,707 | A | 8/1998 | Damm et al. | 174/65 |
| 5,797,431 | A | 8/1998 | Adams | 138/89 |
| 5,845,943 | A | 12/1998 | Ramacier, Jr. et al. | 285/12 |
| 5,967,191 | A | 10/1999 | Mummolo | 138/97 |
| 5,983,920 | A | 11/1999 | Gapinski et al. | 137/231 |

(Continued)

FOREIGN PATENT DOCUMENTS

WO   WO 8000740 A1 *  4/1980

*Primary Examiner*—James M Hewitt
(74) *Attorney, Agent, or Firm*—Wood, Herron & Evans, LLP

(57) ABSTRACT

A fitting for sealing against the inner surface of an inlet includes an elongate mandrel and one or more resilient bushings supported on the mandrel. The fitting has a first condition wherein the resilient bushing can be received within the inlet. The fitting can be actuated to a second condition the resilient bushing expands radially to sealingly engage the inner surface of the inlet. When the inlet is sealingly engaged by the resilient bushing in the second condition, fluid may be admitted to the inlet through an axial bore in the mandrel. When the fitting is used to fill a pipe system, fluid supplied to the inlet may be pressurized to facilitate monitoring the pipe system for leaks. The fitting may include a sealing member configured to seal against a terminal end of the inlet when the bushing is radially expanded to seal against the inner surface of the inlet in the second condition.

12 Claims, 5 Drawing Sheets

U.S. PATENT DOCUMENTS

| | | | |
|---|---|---|---|
| 6,035,898 A | 3/2000 | Dominquez | 138/89 |
| 6,367,313 B1 | 4/2002 | Lubyk | 73/49.8 |
| 6,467,336 B1 * | 10/2002 | Gotowik | 73/49.8 |
| 6,471,254 B2 | 10/2002 | Russell | 285/338 |
| 6,502,864 B1 | 1/2003 | Savard | 285/12 |
| 6,543,780 B1 | 4/2003 | Kogler et al. | 277/312 |
| 6,588,805 B2 | 7/2003 | Persohn et al. | 285/305 |
| 6,675,634 B2 | 1/2004 | Berneski, Jr. et al. | 73/49.8 |
| 2005/0046180 A1 | 3/2005 | Tombler, Jr. et al. | |

* cited by examiner

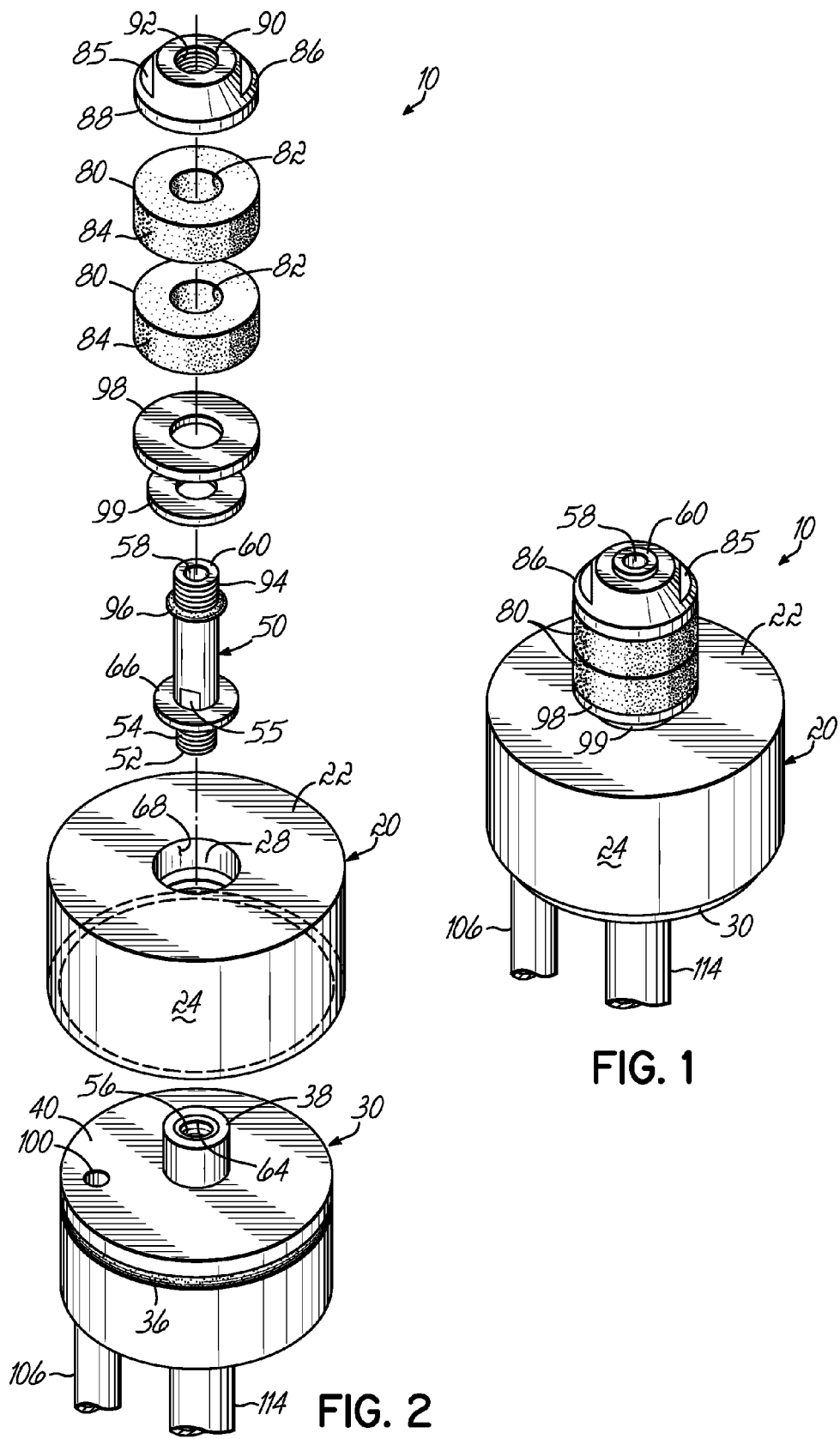

QUICK-CONNECT FITTING

FIELD OF THE INVENTION

The present invention relates generally to fittings for connecting a fluid supply to an inlet, and more particularly to a quick-connect fitting configured to engage the inner surface of a pipe or conduit.

BACKGROUND OF THE INVENTION

Fittings that can be connected to and disconnected from pipes or conduits are useful for filling and leak testing various mechanical systems having a piping network or other configurations of passages adapted to transport fluids, such as refrigeration systems, hydraulic lines, automotive fuel rails and fuel lines, automotive intake and exhaust manifolds, and other systems. In other applications, fittings may be used to facilitate filling containers without leak testing the containers. When many containers are to be filled in succession, or when it is desired to leak test several fluid carrying systems, the fitting should be capable of quick and easy connection and disconnection, while maintaining good sealing integrity with the inlet end of the system or container.

Various quick-connect fittings are known in the art. Conventional quick-connect fittings generally utilize collets or other clamping devices that can crimp, mar, or otherwise damage the surface of a pipe, conduit or other inlet structure to which the fitting is connected. A need therefore exists for an improved fitting that overcomes these and other drawbacks of prior fittings.

SUMMARY OF THE INVENTION

The present invention overcomes the foregoing and other shortcomings and drawbacks of fittings heretofore known for use in coupling to the inner surface of an inlet. While the invention will be described in connection with certain embodiments, it will be understood that the invention is not limited to these embodiments. On the contrary, the invention includes all alternatives, modifications and equivalents as may be included within the spirit and scope of the present invention.

In one aspect in accordance with the principles of the present invention, a fitting that can be quickly and easily coupled to the inner surface of an inlet to a pipe system or a container comprises an elongate mandrel and at least one resilient bushing on the mandrel. The fitting has a first condition wherein the resilient bushing and at least a portion of the mandrel can be inserted within the inlet, and a second condition wherein the resilient bushing radially expands to sealingly engage the inner surface of the inlet. The mandrel has an axial bore that can be coupled to a source of fluid, whereby fluid from the source may be admitted to the inlet when the fitting is coupled to the inlet in the second condition. The fitting is retained within the inlet solely by the resilient bushing in the second condition when fluid is admitted to the inlet.

In another aspect of the invention, the fitting may further include a sealing member that extends radially outwardly from the resilient bushing. The sealing member is configured to abut the terminal end of the inlet when the mandrel and resilient bushing are inserted within the inlet. In the second condition of the fitting, the sealing member sealingly engages to the terminal end of the inlet to further seal the inlet.

In yet another aspect of the invention, the fitting further includes a housing having a cavity formed therein, and a piston slidably disposed within the cavity. The mandrel is coupled to the piston through the housing and the resilient bushing is mounted on the mandrel between the housing and a stop on the mandrel. In the second condition, the housing is caused to move in a direction toward the stop to axially compress the bushing therebetween. In one embodiment, the piston is actuated by a pressurized fluid to move the housing in a direction toward the stop.

These and other features, advantages, and objectives of the invention will become more readily apparent to those of ordinary skill in the art upon review of the following detailed description of the exemplary embodiments, taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

FIG. 1 is an perspective view of an exemplary fitting in accordance with the principles of the present invention;

FIG. 2 is an exploded perspective view of the fitting of FIG. 1;

DETAILED DESCRIPTION

Figure 3A:
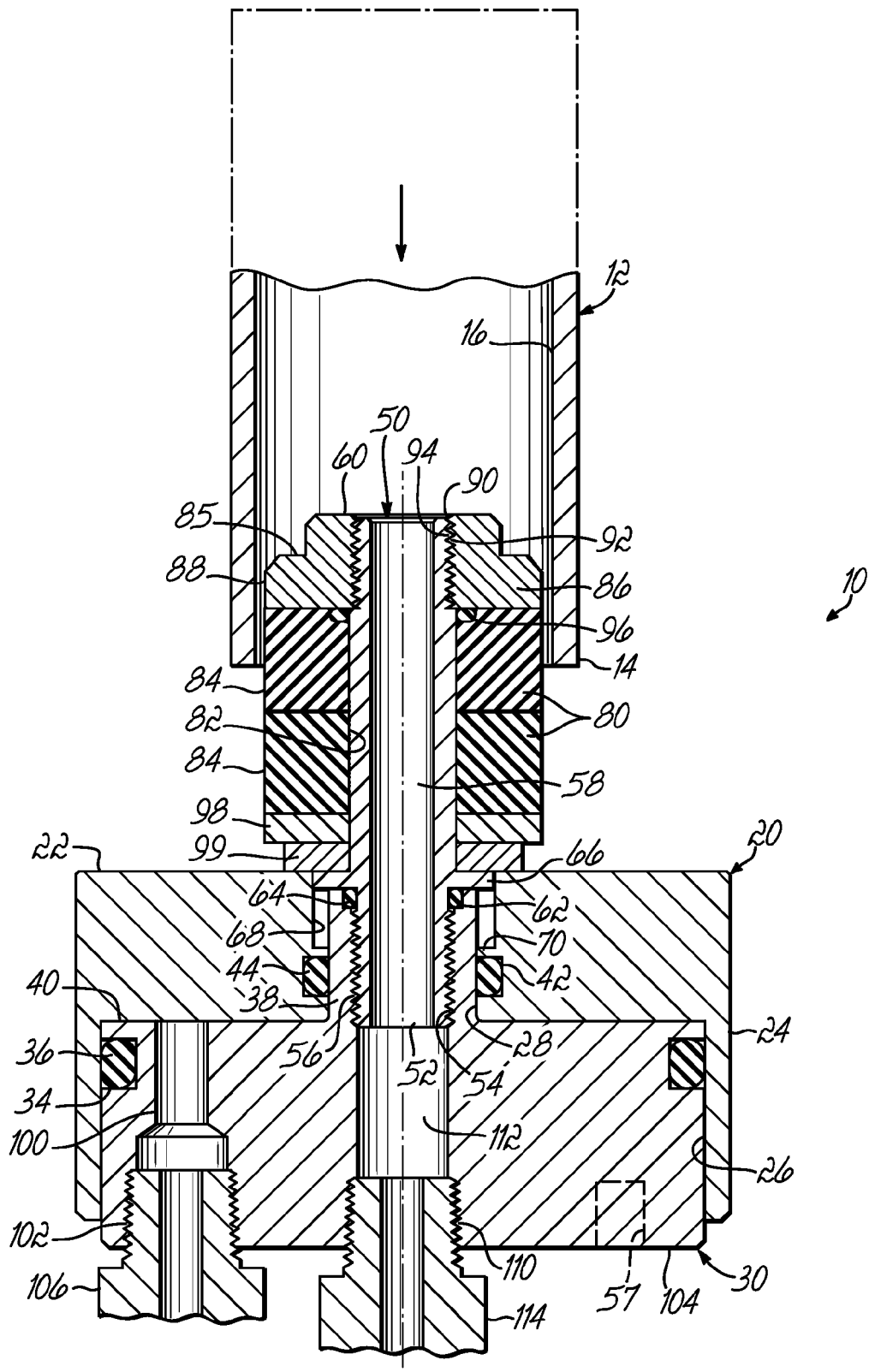
FIG. 3A is a cross-sectional view of the fitting of FIG. 1.
Figure 3B:
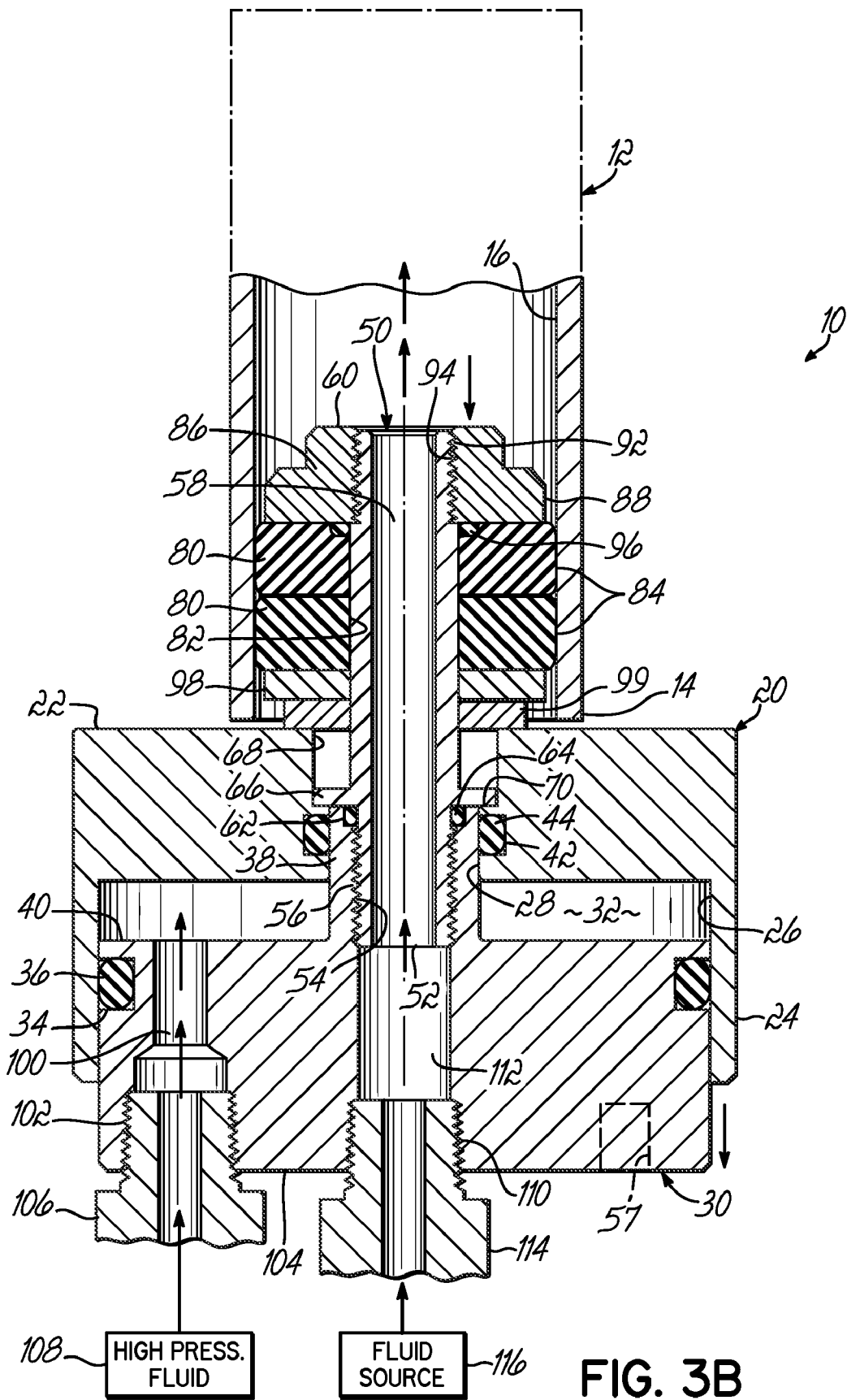
FIG. 3B is a cross-sectional view, similar to FIG. 3A, depicting an inlet pipe or conduit sealingly engaged by the fitting.

FIGS. 1, 2, 3A and 3B depict an exemplary fitting 10 in accordance with the principles of the present invention, for engaging the inner surface 16 of an inlet 12 to a piping system or product to facilitate filling the piping system or product. The fitting 10 includes a housing 20 having an end wall 22 and at least one sidewall 24 extending substantially perpendicularly therefrom to define a cavity 26 (see FIG. 3B) in the housing 20. Housing 20 further includes an aperture 28 through end wall 22 and communicating with cavity 26.

A generally cylindrically-shaped piston 30 is at least partially disposed within the cavity 26 and is slidably movable with respect to housing 20 to define a variable volume space 32 (FIG. 3B) between the piston 30 and the cavity 26. A circumferential groove 34 on the piston 30 accommodates an O-ring 36, whereby the piston 30 is sealingly engaged with the sidewall 24 within the cavity 26. A generally cylindrically-shaped stem 38 protrudes from an upper side 40 of the piston 30 and extends upwardly through the aperture 28 in the end wall 22 of housing 20. An annular groove 42 within the aperture 28 of housing 20 accommodates a second O-ring 44 for sealingly engaging the stem 38 of the piston 30 extending therethrough. Accordingly, the variable volume space 32 defined between the piston 30 and the cavity 26 is fluidly sealed from the external environment.

Fitting 10 further includes an elongate mandrel 50 extending through the aperture 28 in housing 20 and coupled to the piston 30. In the embodiment shown, a first end 52 of the mandrel 50 has external threads 54 configured to engage corresponding internal threads 56 provided on the piston stem 38 for threadably coupling the mandrel 50 to the piston 30. Wrench flats 55 may be provided on the outer surface of the mandrel 50 to facilitate threading the mandrel 50 to the piston 30. Apertures 57 (FIG. 3A) may also be provided in lower surface 104 of piston 30 to facilitate threadably coupling the mandrel 50 and the piston 30, using a spanner wrench for example. The mandrel 50 has an axially extending bore 58 between the first end 52 and the second end 60 for supplying fluid, which may be a gas or a liquid, to the inlet 12 of a piping system or a product to be filled. An annular groove 62 formed in the distal end of the piston stem 38 supports another O-ring 64 for sealing between the mandrel 50 and the piston 30.

A first stop 66, depicted in this embodiment as a generally radially extending flange, is provided on the mandrel 50, intermediate the first and second ends 52, 60. A portion of the aperture 28 through end wall 22 of housing 20 is counterbored 68 to receive the first stop 66 of the mandrel 50. When the mandrel 50 is threadably coupled to the piston 30, the first stop 66 limits relative movement between the piston 30 and housing 20 in a direction where the piston 30 is moving away from the end wall 22, by contact with a ledge 70 defined by the counterbored portion 68 of the aperture 28. Relative movement of the piston 30 in the opposite direction is limited by contact of the piston 30 with end wall 22.

Figure 4A:
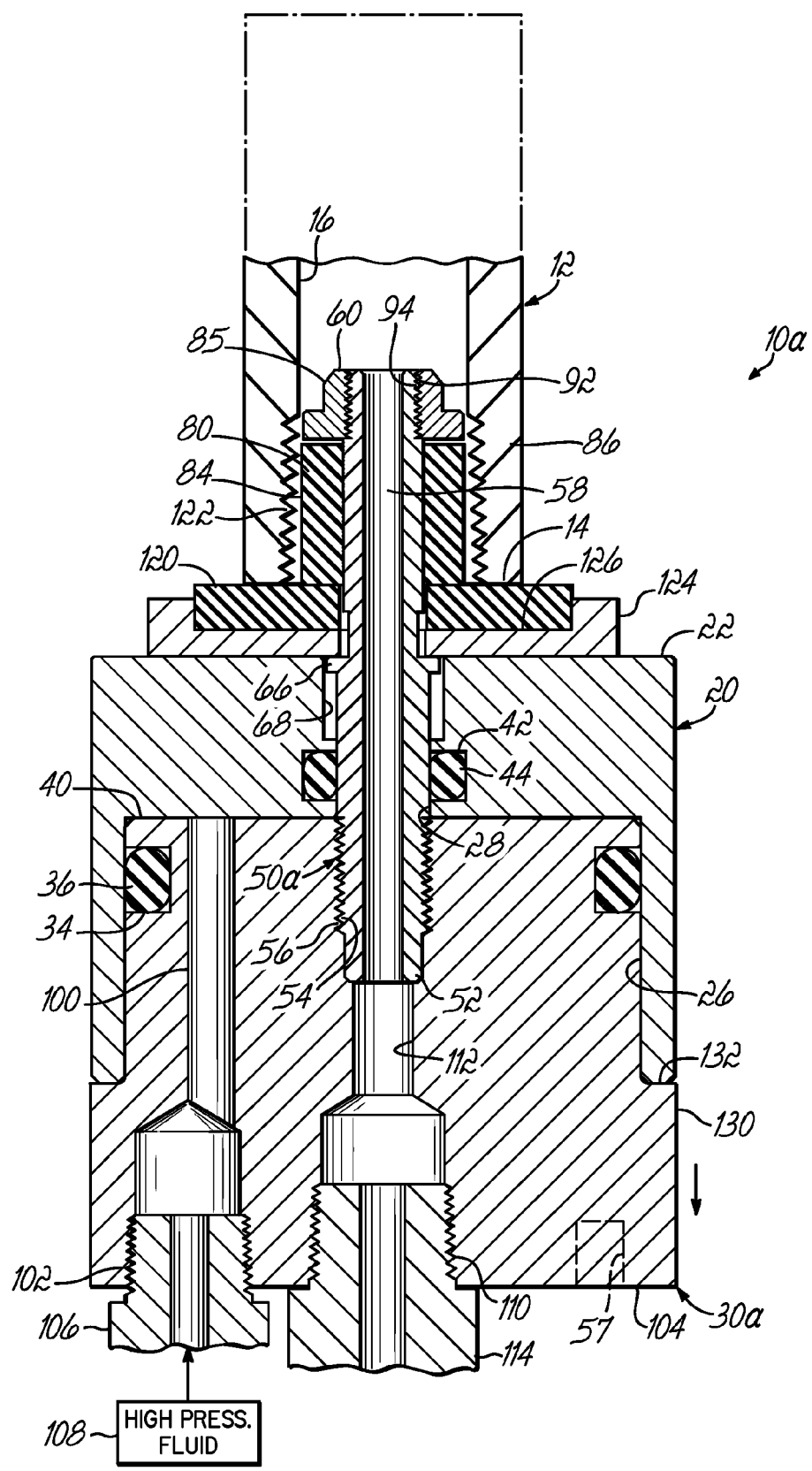
FIG. 4A is a cross-sectional view of another exemplary fitting in accordance with the principles of the present invention.
Figure 4B:
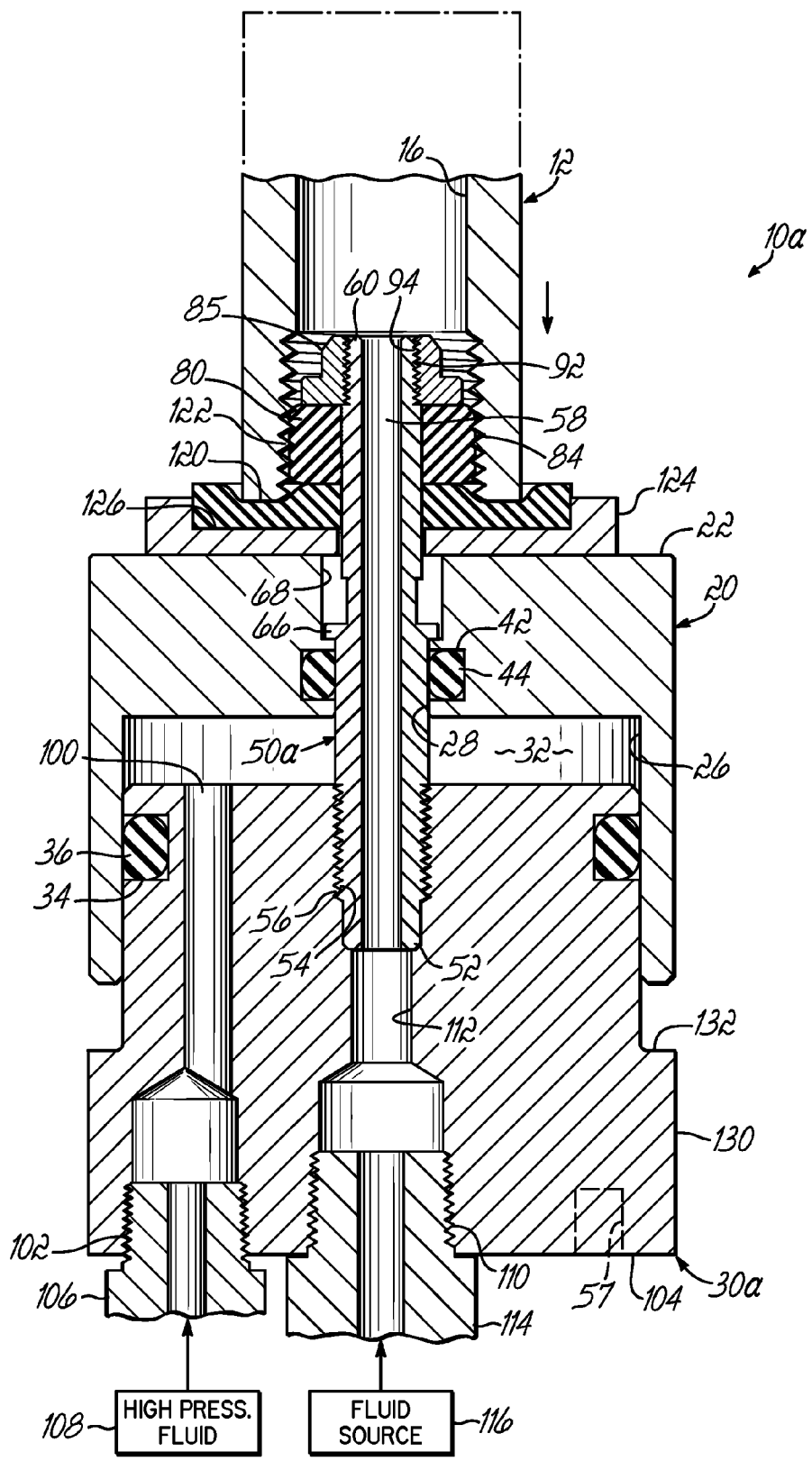
FIG. 4B is a cross-sectional view of the fitting of FIG. 4A, depicting an inlet pipe or conduit sealingly engaged by the fitting.

A pair of resilient bushings 80 is mounted on a portion of the mandrel 50 that extends outwardly from the housing 20, for sealingly engaging the inner surface 16 of the inlet 12. In the embodiment shown, the bushings 80 have generally annular shapes with inner diameters 82 closely corresponding to the outer diameter of the mandrel 50, and outer diameters 84 which in their free, uncompressed state, are sized to easily fit within the inner diameter of the inlet 12. The bushings 80 may be formed from polymeric material, such as Neoprene®, or various other materials suitable for sealing against the inner diameter of the inlet 12 and for exposure to the various fluids which may be used with the fitting 10. While the embodiment in FIG. 3A depicts a pair of resilient bushings 80, it will be understood that a single bushing 80, as depicted in FIGS. 4A and 4B, or more than two bushings 80 may be used as required.

The bushings 80 are retained on the mandrel 50 by a second stop 86 that is removably secured to the second end 60 of the mandrel 50. In the embodiment shown, the second stop 86 comprises an annular member having an outer diameter 88 extending substantially to the outer diameter 84 of the resilient bushings 80 and an inner diameter 90 sized to fit over the second end 60 of the mandrel 50. Internal threads 92 are provided on the inner diameter 90 of the second stop 86 to correspond to external threads 94 formed on the second end 60 of the mandrel 50, whereby the second stop 86 may be threadably secured to the second end 60 of the mandrel 50. The second stop 86 may be threaded onto the second end 60 of the mandrel 50 such that bushings 80 are precompressed, or the threaded length of the mandrel 50 may be configured so that second stop 86 secures the bushings 80 to the mandrel 50 without any precompression. Wrench flats 85 may be provided on second stop 86 to facilitate threading second stop 86 onto the mandrel 50. An O-ring 96 may be provided between the second stop 86 and the resilient bushings 80 to provide additional sealing integrity between the bushings 80 and the second stop 86.

With the resilient bushings 80 mounted to the mandrel 50 and in a generally uncompressed state, the second end 60 of the mandrel 50 may be inserted within the inlet 12. This corresponds to a first condition of the fitting 10, depicted in FIG. 3A. The fitting 10 may then be actuated to a second condition, depicted in FIG. 3B, to cause the housing 20 to move in a direction toward the second stop 86, thereby axially compressing the resilient bushings 80 against the second stop 86. First stop 66, discussed above, limits the amount of compression applied to bushings 80 and prevents the bushings 80 from being rolled over second stop 86. As the resilient bushings 80 are axially compressed between the housing 20 and the second stop 86, the generally unconstrained outer diameters 84 of the resilient bushings 80 expand radially outwardly toward the inner surfaces 16 of the inlet 12. Compression of the resilient bushings 80 continues until the resilient bushings 80 sealingly engage the inner surface 16 of the inlet 12. To facilitate compressing bushings 80, compression washers 98 may be provided on the mandrel 50, between the bushings 80 and the end wall 22 of housing 20. A spacer washer 99 may also be provided on mandrel 50, between the compression washer 98 and end wall 22, to offset washer 98 and bushings 80 from end wall 22.

In the embodiment shown, the fitting 10 is actuated by pneumatic or hydraulic pressure. To this end, the piston 30 includes a first fluid passage 100 communicating with the variable volume space 32 defined between the piston 30 and the cavity 26. A first port 102 is formed in the lower surface 104 of the piston 30 and communicates with the first fluid passage 100. The first port 102 may be coupled by a first fitting 106 to a source 108 (FIG. 3B) of high pressure fluid (gas or liquid) whereby pressurized fluid may be provided through the first fluid passage 100 to the variable volume space 32 to thereby cause the housing 20 to move away from the piston 30 and in a direction toward the second stop 86. Because the mandrel 50 is threadedly coupled to the piston 30, movement of the housing 20 in this direction compresses the resilient bushings 80 against the second stop 86 as described above.

When the fitting 10 is in the second condition, with the resilient bushings 80 axially compressed and radially expanded to sealingly engage the inner surface 16 of inlet 12, a fluid, which may be a gas or a liquid, may be admitted to the inlet 12 through the axial bore 58 of the mandrel 50. In the embodiment shown, a second port 110 is formed in the piston 30 and communicates with a second passage 112 through the piston 30, which in turn communicates with the axial bore 58 of the mandrel 50. The second port 110 is configured to receive a fitting 114 for coupling the second port 110 to a source of fluid 116 for filling a pipe system or container through inlet 12.

When the fitting 10 is used to facilitate leak testing of a piping system, the fluid admitted to inlet 12 may be pressurized to a desired level and the piping system monitored using pressure gauges or leak testing equipment such as any of the various monitoring and detection systems available from Cincinnati Test Systems, Inc. of Cincinnati, Ohio. In other applications, fitting 10 may be used to simply fill a container or conduit system with a desired fluid. After a container has been filled, or after a pipe system has completed leak testing, the flow of fluid through the second passage 112 and axial bore 58 may be stopped, using a valve (not shown) for example. Fluid pressure within the variable volume space 32 may then be relieved through the first passage 100 and first port 102 to permit the housing 20 to move in a direction away from the second stop 86, whereby the resilient bushings 80 are returned to a generally uncompressed state and their outer diameters 84 are disengaged from the inner surface 16 of the inlet 12. Movement of the housing 20 away from the second stop 86 may be assisted by the expansion of the resilient bushings 80 from the compressed state to the generally uncompressed state. Thereafter, the second end 60 of the mandrel 50 may be withdrawn from the inlet 12. If it is desired to test and/or fill another system or container, the second end 60 of the mandrel 50 may thereafter be inserted within the inlet 12 of another system or container to fill and or test the system or container in the same manner generally described above.

FIGS. 4A and 4B depict another exemplary fitting 10a, in accordance with the principles of the present invention. The fitting 10a of FIGS. 4A and 4B is similar to the fitting 10 of FIGS. 1, 2, 3A and 3B, and like components have been similarly numbered. Fitting 10a illustrates an embodiment wherein a single resilient bushing 80 is used to sealingly engage the inner surface 16 of an inlet 12 to a pipe system or a container to be filled with fluid. The fitting 10a further includes an additional sealing member 120 positioned between the resilient bushing 80 and the housing 20 and extending radially outwardly from the resilient bushing 80 to create a sealing surface for engaging the distal end 14 of the inlet 12. This embodiment is particularly suitable for use with inlets 12 having internal threads 122 formed adjacent the distal end 14, where such internal threads 122 might inhibit the sealing ability of the resilient bushings 80.

In the embodiment shown, sealing member 120 is retained adjacent the end wall 22 of the housing 20 by a generally flat plate 124 having a recess 126 formed therein and sized to receive the sealing member 120. When it is desired to admit fluid to the inlet 12 of the pipe system or container, the second end 16 of the mandrel 50a is inserted within the inlet 12, as described above, until the sealing member 120 abuts the distal end 14 of the inlet 12. Pressurized fluid is then directed to the variable volume space 32 through the first port 102 and first fluid passage 100 to cause the housing 20 to move in a direction toward the second stop 86, in a manner similar to that described above. The resilient bushing 80 is axially compressed and caused to expand radially outwardly such that it engages the inner surface 16 of the inlet 12. A the same time, the sealing member 120 is axially compressed against the distal end 14 of the inlet 12, as depicted in FIG. 4B, to further seal inlet 12. Fluid may then be admitted to the inlet 12 from a fluid source 116 coupled via the second fitting 114 to the second port 110 and communicating with the inlet 12 through the second fluid passageway 112 and the axial bore 58 through the mandrel 50.

In the embodiment depicted in FIGS. 4A and 4B, the piston 30a does not include a stem extending within the first aperture 28 in the end wall 22 of the housing 20. Rather, the mandrel 50 extends through the first aperture 28 and is threadably coupled to the piston 30a in a manner similar to that shown and described with respect to fitting 10. The piston 30a also includes a radially enlarged portion 130 proximate the lower surface 104. This radially enlarged portion 130 defines a ledge 132 that can be utilized to limit the relative movement of the housing 20 and piston 30a in directions toward one another when the sidewall 24 of the housing 20 contacts the ledge 132 as depicted in FIG. 4A.

Fittings in accordance with the principles of the present invention, such as those shown and described herein, can be quickly and easily connected to an inlet of a pipe system or a container to sealingly engage the inlet and permit filling and/or leak testing thereof. The inlet is firmly secured to the fitting 10, 10a by the resilient bushings 80, without the need for collets or other mechanical devices that present risks of marring or otherwise damaging the inlet.

While exemplary fittings 10, 10a have been shown and described herein as being actuated between the first and second conditions by pressurized fluid, it will be understood that a fitting in accordance with the principles of the present invention may alternatively be actuated between the first and second conditions by mechanical mechanisms, such as cams, levers, or threaded members, or by various other methods suitable for radially expanding the resilient bushings to sealingly engage the inner surface of an inlet.

While the present invention has been illustrated by the description of an embodiment thereof, and while the embodiment has been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A fitting for sealingly engaging an inlet having an inner surface and a terminal end, the fitting comprising:
   an elongate mandrel having an axial bore couplable to a source of fluid;
   at least one resilient bushing disposed on said mandrel;
   a sealing member extending radially outwardly from said resilient bushing;
   the fitting having a first condition wherein said resilient bushing and at least a portion of said mandrel can be inserted within the inlet to position said sealing member in abutting relationship with the terminal end of the inlet, and having a second condition wherein said resilient bushing radially expands to sealingly engage the inner surface and said sealing member is axially compressed against the terminal end of the inlet;
   said mandrel retained within the inlet solely by said resilient bushing in said second condition, when fluid is admitted into the inlet through said axial bore.

2. The fitting of claim 1, further comprising:
   a stop on said mandrel;
   a housing coupled to said mandrel and spaced from said stop, said housing and said stop relatively movable toward one another in said second condition to axially compress said resilient bushing between said housing and said stop.

3. The fitting of claim 2, wherein said housing compresses said sealing member against the inlet in said second condition.

4. The fitting of claim 2, wherein the fitting is pneumatically actuated to move said housing and said stop toward one another in said second condition.

5. The fitting of claim 2, further comprising:
   a cavity formed in said housing;
   a piston slidably disposed within said cavity and movable within said cavity to cause said housing and said stop to move toward one another in said first condition.

6. The fitting of claim 5, wherein said piston is pneumatically actuable to move within said cavity.

7. The fitting of claim 5, further comprising:
   a variable volume space defined between said piston and said cavity;
   a first port communicating with said variable volume space and couplable to a source of pressurized fluid;
   said housing and said stop caused to move toward one another in said second condition when said variable volume space is exposed to high pressure fluid through said first port.

8. The fitting of claim 7 wherein said first port is formed through said piston.

9. The fitting of claim 5, further comprising:
a fluid passage through said piston and communicating with said axial bore of said mandrel.

10. The fitting of claim 5, wherein said mandrel is coupled to said piston.

11. A fitting couplable to an inlet having an inner diameter and an inner surface, the fitting comprising:
a housing having an end wall and at least one sidewall extending from said end wall to define a cavity in said housing;
an aperture through said end wall and communicating with said cavity;
a piston at least partially disposed within said cavity and slidably sealingly engaged with said sidewall to define a variable volume space between said piston and said cavity;
an elongate mandrel having a first end coupled to said piston and a second end extending through said aperture outwardly of said housing;
a first stop on said mandrel, said first stop engaging said housing to limit movement of said piston in a direction away from said end wall;
an axially extending bore through said mandrel, said bore couplable to a source of pressurized fluid; and
at least one resilient bushing disposed on said mandrel;
the fitting having a first condition wherein said resilient bushing and at least a portion of said mandrel can be inserted within the inner diameter of the inlet, and having a second condition wherein said resilient bushing radially expands to sealingly engage the inner surface of the inlet;
said mandrel retained within the inner diameter of the inlet solely by said resilient bushing in said second condition, when pressurized fluid is admitted into the inlet through said axial bore.

12. The fitting of claim 11, further comprising:
a second stop on said mandrel;
said housing axially compressing said resilient bushings against said second stop in said second condition of the fitting.

* * * * *